Sept. 24, 1940.  M. F. PETERS  2,215,476

SOLDERLESS JOINT AND METHOD OF MAKING

Filed May 11, 1938

INVENTOR
MELVILLE F. PETERS
BY
ATTORNEY

Patented Sept. 24, 1940

2,215,476

UNITED STATES PATENT OFFICE 2,215,476

SOLDERLESS JOINT AND METHOD OF MAKING

Melville F. Peters, Beltsville, Md.

Application May 11, 1938, Serial No. 207,417

3 Claims. (Cl. 29—148)

(Granted under the act of March 3, 1883, as amended April 30, 1928; 370 O. G. 757)

This invention relates to a method of and means for effecting a joint between two parts, particularly metal parts, where it is undesirable or not feasible to use solder.

Among the several objects of this invention are:

To provide a means for joining parts without the use of solder;

To provide a means for effecting an electrically conductive joint between two or more parts where the use of solder is undesirable;

To provide means for making an electrically conductive joint between metal parts where the relative positions of said parts are such or the parts are of such metal that soldering cannot be practiced.

Other objects will be apparent to those skilled in this art from the description that follows.

Figure 7:
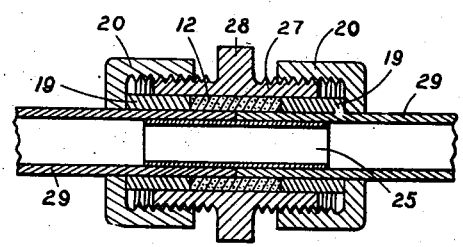

Fig. 7 discloses my invention in a form adapted to join two tubular members end to end.

It is to be understood that the illustrations in the drawing are for the purpose of clarifying my invention and not to place any limitation thereon, since it is obvious a solid rod may be substituted for the tubular member within the purview of my invention and other similar changes will readily occur to those conversant with this art.

It is well-known that the use of solder for joining two elements is frequently undesirable owing to the tendency to corrosion at soldered joints, to the fact that certain metals do not readily form a permanent joint with solder because of imperfect adhesion, and to the nature of the joint to be made as in securing a cylindrical member endwise to the face of a plate, etc. While my invention will be described in connection with the joining of metal parts to form an electrically conductive joint, it is to be understood that my invention is not limited to metals, but the underlying principle thereof may be utilized for joining non-metallic elements as well.

Basically, my invention comprises disposing a portion of one of the parts to be joined within a recess carried by the other part, placing around the portion of the first part metal in a form that occupies a greater space than the actual volume of the metal, such as foil or grains of metal, then applying force to the metal to compact it into a tight binding engagement with the wall of the recess and with the portion disposed in that recess, thereby effectually joining the two parts. As examples of suitable metals, I mention aluminum, copper and lead, though almost any metal will serve particularly if it has a reasonable degree of plasticity when cold.

Figure 1:
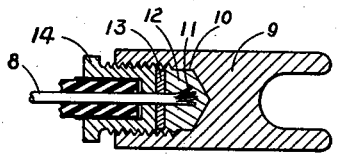
Fig. 1 is a longitudinal section on the line 1—1, Fig. 2 showing my invention utilized to join a conductor to a clip adapted to engage a spark plug or binding post.
Figure 2:
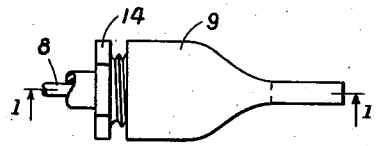
Fig. 2 is a side elevation of Fig. 1.

In Figs. 1 and 2, I have shown, by way of example, my invention utilized to join the electrical conductor 8 to a clip 9 adapted to connect the conductor 8 to the center electrode of a spark plug or to a binding post. The clip 9 has formed in it a recess 10 in which the end 11 of the conductor is disposed. It may be found preferable in some instances to deform the end 11 by turning it over laterally or by spreading out the end of the conductor or both. A quantity of metal 12 in compactible form is disposed around the end 11 in recess 10 and the washer 13, which has previously been threaded upon the conductor 8 together with the gland nut 14, is seated against the metal 12 and then the gland nut is tightened down into the recess, thereby reducing the space occupied by the metal 12 substantially to the real volume of the metal and forcing the metal into tight binding engagement with both the conductor 8 and the wall of the recess 10, thus effecting a permanent electrically conductive joint between the clip 9 and the conductor 8.

Figure 3:
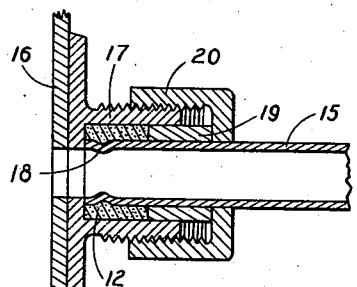
Fig. 3 is an axial section through a tubular member joined endwise to the face of a plate.

Fig. 3 depicts a tubular member 15 secured with an end against the face of a plate 16. Here a threaded nipple 17 is carried by the plate 16, being secured thereto in any well-known manner that is feasible. The tubular member 15 has formed in its face a groove 18 to form an interlock with the metal 12 that is initially in a compactible form. Around the tubular member 15 and fitting into the recess in nipple 17 is a sleeve 19 engaged by a nut 20 that is threaded upon nipple 17. It is obvious that when the nut 20 is screwed upon the nipple 17, sleeve 19 will be forced against the metal 12, thus compacting that metal into the groove 18 and into a firm joint engagement with the tubular member 15 and the inner wall of nipple 17.

Figure 5:
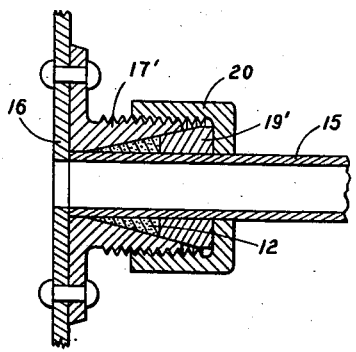
Fig. 5 shows a modification of my invention for joining a tubular member endwise to a plate.

Fig. 5 discloses a modified form of the structure shown in Fig. 3 in that the nipple 17' has a frusto-conical bore rather than cylindrical as in Fig. 3 and the sleeve 19' is tapered to conform to the bore in nipple 17', the sleeve 19' being preferably longitudinally split.

Figure 4:
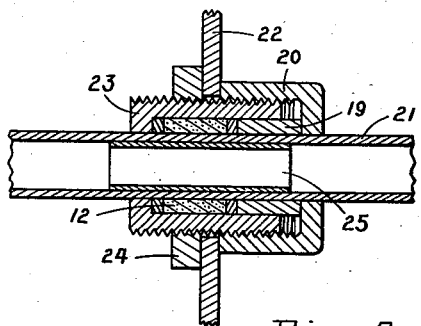
Fig. 4 depicts my invention in a form adapted to making an electrical joint between a tubular member and a plate through which the tubular member passes.

Fig. 4 shows my invention employed to connect the tubular member 21 to a plate 22 through which the tubular member passes. Here the nipple 23 is threaded from end to end and passes through the plate 22, the nut 24 engaged with the nipple preventing movement of the nipple through plate 22 when the nut 20 is screwed down to force the sleeve 19 inwardly for the purpose of compacting the metal 12. In case the tubular member 21 is thin and might be crushed or readily deformed by the pressure of the metal 12, a reinforcing sleeve 25 may be placed inside the member 21 throughout the zone subjected to the pressure of metal 12.

Figure 6:
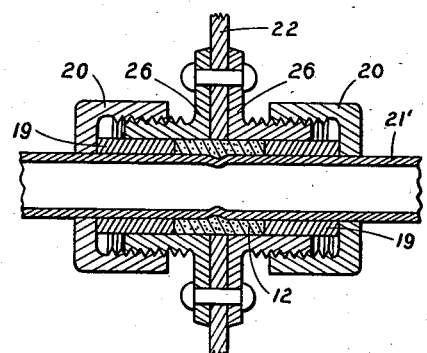
Fig. 6 is a modified form of the construction shown in Fig. 4.

Fig. 6 is a variant of the form of my invention in Fig. 4. In this case the two nipples 26 are secured on two opposite sides of the plate 22 in coaxial relation with each other. The metal 12 disposed around the tubular member 21' is compacted between sleeves 19 and nuts 20 by tightening down in the manner above described.

Fig. 7 illustrates the use of my invention to connect two tubular members in end to end relation. Here the double nipple 27 has intermediate its ends a circumferential rib 28 provided with faces adapted to be gripped by a wrench. The tubular members 29 that are to be joined are inserted into the nipple 27 so that their ends abut substantially at the center of the nipple and the metal 12 is disposed in the nipple around the members 29. Sleeves 19 are then forced inwardly between nuts 20 to compact the metal 12 and thereby lock the two members 29 in position, a reinforcing sleeve 25 being disposed to overlie the junction of the members 29 if preferred.

The invention herein described and claimed may be used and/or manufactured by or for the Government of the United States of America for governmental purposes without the payment of any royalties thereon or therefor.

I claim:

1. A method of joining metal parts, comprising the steps of providing one of said parts with a recess and the other of said parts with a portion insertable in said recess with space around the said portion, introducing into said space granular metal and compacting said granular metal into substantially a solid body, thereby forcing said compacted metal into binding engagement with said portion and with the wall of said recess.

2. Means for joining two bodies whereof one is provided with a recess and the other with a portion disposed in said recess, comprising soft metal in small grains disposed in said recess around said portion and means engaged with that said body provided with a recess and bearing upon said soft metal to compact said metal into a solid body to form a bond between said two bodies to be joined.

3. Means for joining two bodies whereof one is provided with a recess and the other with a portion disposed in said recess, comprising a solid body of soft metal in said recess around said portion forming a bond between said bodies, said metal having been introduced into said recess in granular form and solidified by pressure.

MELVILLE F. PETERS.